United States Patent [19]

Goshaw et al.

[11] Patent Number: 5,231,846
[45] Date of Patent: Aug. 3, 1993

[54] METHOD OF COMPRESSOR STAGING FOR MULTI-COMPRESSOR MULTI-CIRCUITED REFRIGERATION SYSTEMS

[75] Inventors: Craig M. Goshaw, La Crosse; Robert L. Oltman, Stoddard, both of Wis.

[73] Assignee: American Standard Inc., New York, N.Y.

[21] Appl. No.: 8,917

[22] Filed: Jan. 26, 1993

[51] Int. Cl.$^5$ .............................................. F25B 7/00
[52] U.S. Cl. .................................... 62/175; 62/510; 417/8
[58] Field of Search .............. 62/175, 510; 236/1 EA; 417/7, 8

[56] References Cited

U.S. PATENT DOCUMENTS

| | | | |
|---|---|---|---|
| 4,152,902 | 5/1979 | Lush | 417/7 |
| 4,341,983 | 7/1982 | Gottliebson | 417/7 |
| 5,123,526 | 6/1992 | Oltman | 62/175 |

FOREIGN PATENT DOCUMENTS

0078043  5/1983  Japan ...................................... 62/175

*Primary Examiner*—William E. Wayner
*Attorney, Agent, or Firm*—William J. Beres; William O'Driscoll; Peter D. Ferguson

[57] ABSTRACT

A method of staging and modulating compressors in a multi-circuited refrigeration system including a plurality of condensing heat exchange circuits where each condensing heat exchange circuit includes a plurality of compressors. The method comprises the steps of: accumulating a first operative condition for each compressor; accumulating a second operative condition for each compressor; determining the status of each compressor in each circuit and designating therefrom a first list of circuits having compressors available to be turned on and a second list of circuits having compressors available to be turned off. The method also comprises the steps of: initiating operation of the compressor from the first list with the lowest accumulation of the first operative condition whenever the system calls for an increase in capacity; terminating operation of the compressor from the second list having the greatest accumulation of the second operative condition whenever the system calls for a decrease in capacity; determining the number of compressors which should be modulating; and modulating, subject to the modulating compressor number determining step, the compressors necessary to meet the modulating compressor number in accordance with the greatest accumulation of the second operative condition.

20 Claims, 5 Drawing Sheets

| | | ACCUMULATED STARTS | | |
|---|---|---|---|---|
| 90 | | | ACCUMULATED RUN TIME | 92 |

| 94 | 96 | CIRCUIT A | | | CIRCUIT B | | | CIRCUIT C | | | |
|---|---|---|---|---|---|---|---|---|---|---|---|
| # ON | ACTION | C1 | C2 | C3 | C4 | C5 | C6 | C7 | C8 | C9 | |
| 1 | ADD | | | | | | | | | $ON_m$ | 100 |
| 2 | ADD | | | | | | $ON_m$ | | | $ON_m$ | 102 |
| 3 | ADD | | | $ON_m$ | | | $ON_m$ | | | $ON_m$ | 104 |
| 4 | ADD | | | ON | | | $ON_m$ | | $ON_m$ | $ON_m$ | 106 |
| 5 | ADD | | | ON | | $ON_m$ | ON | | $ON_m$ | $ON_m$ | 108 |
| 6 | ADD | | $ON_m$ | ON | | ON | ON | | $ON_m$ | $ON_m$ | 110 |
| 7 | ADD | | ON | ON | | ON | ON | $ON_m$ | $ON_m$ | $ON_m$ | 112 |
| 8 | ADD | | ON | ON | $ON_m$ | ON | ON | ON | $ON_m$ | $ON_m$ | 114 |
| 9 | ADD | $ON_m$ | ON | ON | ON | ON | ON | ON | $ON_m$ | $ON_m$ | 116 |
| 8 | SUBTRACT | ON | ON | ON | ON | ON | $ON_m$ | $ON_m$ | $ON_m$ | | 118 |
| 7 | SUBTRACT | ON | ON | $ON_m$ | ON | ON | | $ON_m$ | $ON_m$ | | 120 |
| 6 | SUBTRACT | ON | ON | | ON | $ON_m$ | | $ON_m$ | $ON_m$ | | 122 |
| 5 | SUBTRACT | ON | ON | | $ON_m$ | $ON_m$ | | $ON_m$ | | | 124 |
| 4 | SUBTRACT | ON | $ON_m$ | | $ON_m$ | | | $ON_m$ | | | 126 |
| 3 | SUBTRACT | $ON_m$ | | | $ON_m$ | | | $ON_m$ | | | 128 |
| 2 | SUBTRACT | $ON_m$ | | | $ON_m$ | | | | | | 130 |
| 1 | SUBTRACT | $ON_m$ | | | | | | | | | 132 |
| 0 | SUBTRACT | | | | | | | | | | 134 |

FIG. 5

| # ON | ACTION | CIRCUIT A | | | CIRCUIT B | | | CIRCUIT C | | | |
|---|---|---|---|---|---|---|---|---|---|---|---|
| | | C1 | C2 | C3 | C4 | C5 | C6 | C7 | C8 | C9 | |
| 1 | ADD | | | | | | | | | $ON_m$ | 200 |
| 2 | ADD | | | | | | $ON_m$ | | | $ON_m$ | 202 |
| 3 | ADD | | | $ON_m$ | | | $ON_m$ | | | $ON_m$ | 204 |
| 4 | ADD | | | $ON_m$ | | | $ON_m$ | | ON | $ON_m$ | 206 |
| 5 | ADD | | | $ON_m$ | | ON | $ON_m$ | | ON | $ON_m$ | 208 |
| 6 | ADD | | ON | $ON_m$ | | ON | $ON_m$ | | ON | $ON_m$ | 210 |
| 7 | ADD | | ON | $ON_m$ | | ON | $ON_m$ | ON | ON | $ON_m$ | 212 |
| 8 | ADD | | ON | $ON_m$ | ON | ON | $ON_m$ | ON | ON | $ON_m$ | 214 |
| 9 | ADD | ON | ON | $ON_m$ | ON | ON | $ON_m$ | ON | ON | $ON_m$ | 216 |
| 8 | SUBTRACT | ON | ON | $ON_m$ | ON | ON | $ON_m$ | ON | $ON_m$ | | 218 |
| 7 | SUBTRACT | ON | ON | $ON_m$ | ON | $ON_m$ | | ON | $ON_m$ | | 220 |
| 6 | SUBTRACT | ON | $ON_m$ | | ON | $ON_m$ | | ON | $ON_m$ | | 222 |
| 5 | SUBTRACT | ON | $ON_m$ | | ON | $ON_m$ | | $ON_m$ | | | 224 |
| 4 | SUBTRACT | ON | $ON_m$ | | $ON_m$ | | | $ON_m$ | | | 226 |
| 3 | SUBTRACT | $ON_m$ | | | $ON_m$ | | | $ON_m$ | | | 228 |
| 2 | SUBTRACT | $ON_m$ | | | $ON_m$ | | | | | | 230 |
| 1 | SUBTRACT | $ON_m$ | | | | | | | | | 232 |
| 0 | SUBTRACT | | | | | | | | | | 234 |

METHOD OF COMPRESSOR STAGING FOR MULTI-COMPRESSOR MULTI-CIRCUITED REFRIGERATION SYSTEMS

BACKGROUND OF THE INVENTION

The present invention is directed to staging compressors in a multi-compressor multi-circuited refrigeration system, and more particularly, to determining which compressors to stage on and off and which compressors to modulate in a multi-circuited refrigeration system where each circuit is associated with more than one compressor.

In a multi-compressor refrigeration system it is desirable to equalize compressor wear between all of the operating compressors Two significant components of compressor wear are a compressors accumulated run time and the number of starts a compressor has experienced. Thus, a staging scheme that starts a compressor based on the lowest number of starts and stops a compressor based on the greatest accumulated run time will tend to equalize these components of compressor wear. Such a scheme is described in U.S. Pat. No. 5,123,256 which is assigned to the assignee of the present invention and hereby incorporated by reference The system shown in this patent has a single refrigeration circuit with a plurality of compressors associated with that circuit The system of this patent works well with single circuited refrigeration circuits and with systems having a one-for-one correspondence between compressors and refrigeration circuits. However, in a system having multiple refrigeration circuits with multiple compressors associated with each circuit, it is desirable to spread the system capacity over all of the refrigeration circuits so as to maximize the heat exchange surface area, and it is also desirable to optimize compressor modulation on each refrigeration circuit.

SUMMARY OF THE INVENTION

It is an object, feature and an advantage of the present invention to overcome the problems in previous staging systems.

It is an object, feature and an advantage of the present invention to provide a multi-circuited, multi-compressor refrigeration system which spreads the system capacity over all of the refrigeration circuits while equalizing individual compressor runtime and the number of individual compressor starts.

It is a further object, feature and advantage of the present invention to optimize compressor modulation in each refrigeration circuit.

It is yet a further object, feature and advantage of the present invention to modulate the compressor with the greatest accumulated run time.

It is an object, feature and an advantage of the present invention to modulate the last compressor staged on together with the compressor with the most accumulated run time.

It is an object, feature and an advantage of the present invention to modulate compressors in pairs or groups so as to balance the percent of rated amps or motor current draw.

The present invention provides a method of staging and modulating compressors in a multi-circuited refrigeration system including a plurality of condensing heat exchange circuits where each condensing heat exchange circuit includes a plurality of compressors. The method comprises the steps of: accumulating a first operative condition for each compressor; accumulating a second operative condition for each compressor; determining the status of each compressor in each circuit and designating therefrom a first list of circuits having compressors available to be turned on and a second list of circuits having compressors available to be turned off; initiating operation of the compressor from the first list with the lowest accumulation of the first operative condition whenever the system calls for an increase in capacity; terminating operation of the compressor from the second list having the greatest accumulation of the second operative condition whenever the system calls for a decrease in capacity; determining the number of compressors which should be modulating; and modulating, subject to the modulating compressor number determining step the compressors necessary to meet the modulating compressor number in accordance with the greatest accumulation of the second operative condition.

The present invention further provides a method of staging a plurality of compressors in a refrigeration system including a plurality of condensing circuits where the number of compressors is greater than the number of condensing circuits and where at least one compressor is operationally associated with each circuit and where more than one circuit has more than one compressor operatively associated with it. The method comprises the steps of: accumulating a first operative condition for each compressor; accumulating a second operative condition for each compressor; determining which circuits have compressors available to be turned on; determining which circuits have compressors available to be turned off; initiating operation of the compressor with the fewest accumulation of the first operative condition from the available on list whenever the system calls for an increase in system capacity; terminating operation of the compressor with the greatest accumulation of the second operative condition from the available off list whenever the system calls for a decrease in capacity; and modulating both the last compressor turned on and at least the compressor with the greatest accumulation of the second operative condition.

The present invention also provides a method of staging a plurality of compressors in a refrigeration system including a plurality of condensing circuits where the number of compressors is greater than the number of condensing circuits and where at least one compressor is operationally associated with each circuit and where more than one circuit has more than one compressor operatively associated with it. The method comprises the steps of: accumulating a first operative condition for each compressor; accumulating a second operative condition for each compressor; determining which circuits have compressors available to be turned on; determining which circuits have compressors available to be turned off, initiating operation of the compressor with the fewest accumulation of the first operative condition from the available on list whenever the system calls for an increase in system capacity; terminating operation of the compressor with the greatest accumulation of the second operative condition from the available off list whenever the system calls for a decrease in capacity; and modulating compressors in groups of at least two compressors.

DETAILED DESCRIPTION OF THE INVENTION

Figure 1:
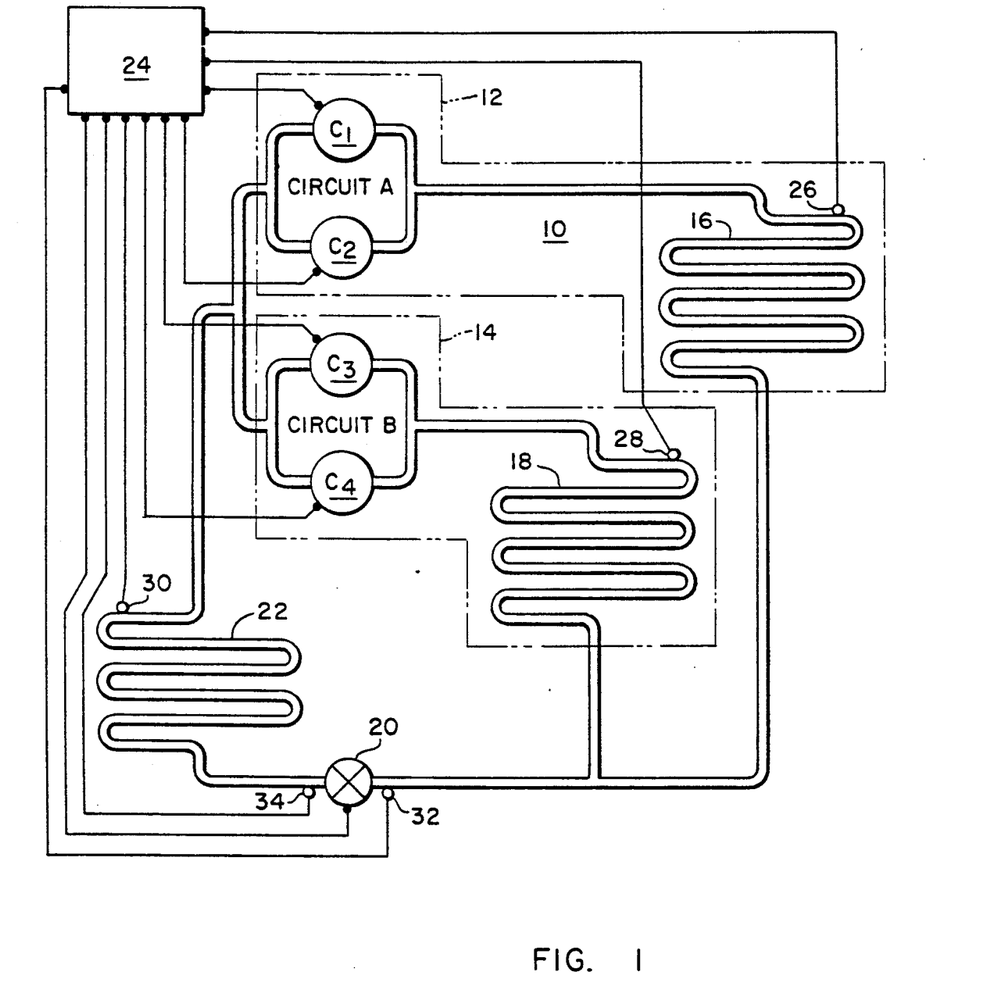
FIG. 1 is a diagram of a refrigeration system to which the present invention could apply, the refrigeration system having a pair of circuits with two compressors in each circuit.

FIG. 1 shows a representative refrigeration system 10 to which the present invention can be applied. The system includes a pair of refrigeration circuits 12. 14. The refrigeration circuit 12, also identified as circuit A. includes a pair of compressors C1, C2 in parallel and a condensing heat exchanger 16 which is in series with the compressors C1, C2 Similarly, the refrigeration circuit 14, also referred to as circuit B includes a pair of compressors C3, C4 in parallel and a condensing heat exchanger 18 in series with the compressors C3, C4.

The refrigeration system 10 also includes an expansion device 20 such as an expansion valve, capillary tube or the like, and an evaporating heat exchanger 22. Refrigeration conduit interconnects the circuits 12, 14 in parallel, and also interconnects the expansion device 20 and the evaporating heat exchanger 20 in series with the A and B refrigeration circuits. As described in U.S. Pat. No. 5,123,256 previously incorporated herein by reference, a system controller 24 controls the staging of the compressors C1 through C4 in response to a variety of sensor inputs such as condensing heat exchanger sensors 26 and 28 evaporating heat exchanger 30, liquid line sensor 32, and suction line sensor 34. Once a compressor C1 through C4 is turned on the system controller 24 may also control the modulation thereof.

As documented by U.S. Pat. No. 5,123,256 the system controller 24 is able to monitor motor current draw or motor phase for each compressor C1 through C4 to determine if each of these compressors is on The system controller 24 maintains a data file for each compressor C1 through C4 and accumulates run time for each compressor C1 through C4 by adding the change in time since the last periodic interrupt to an accumulated run time. Additionally, accumulated starts for each compressor is monitored and recorded.

Figure 2:
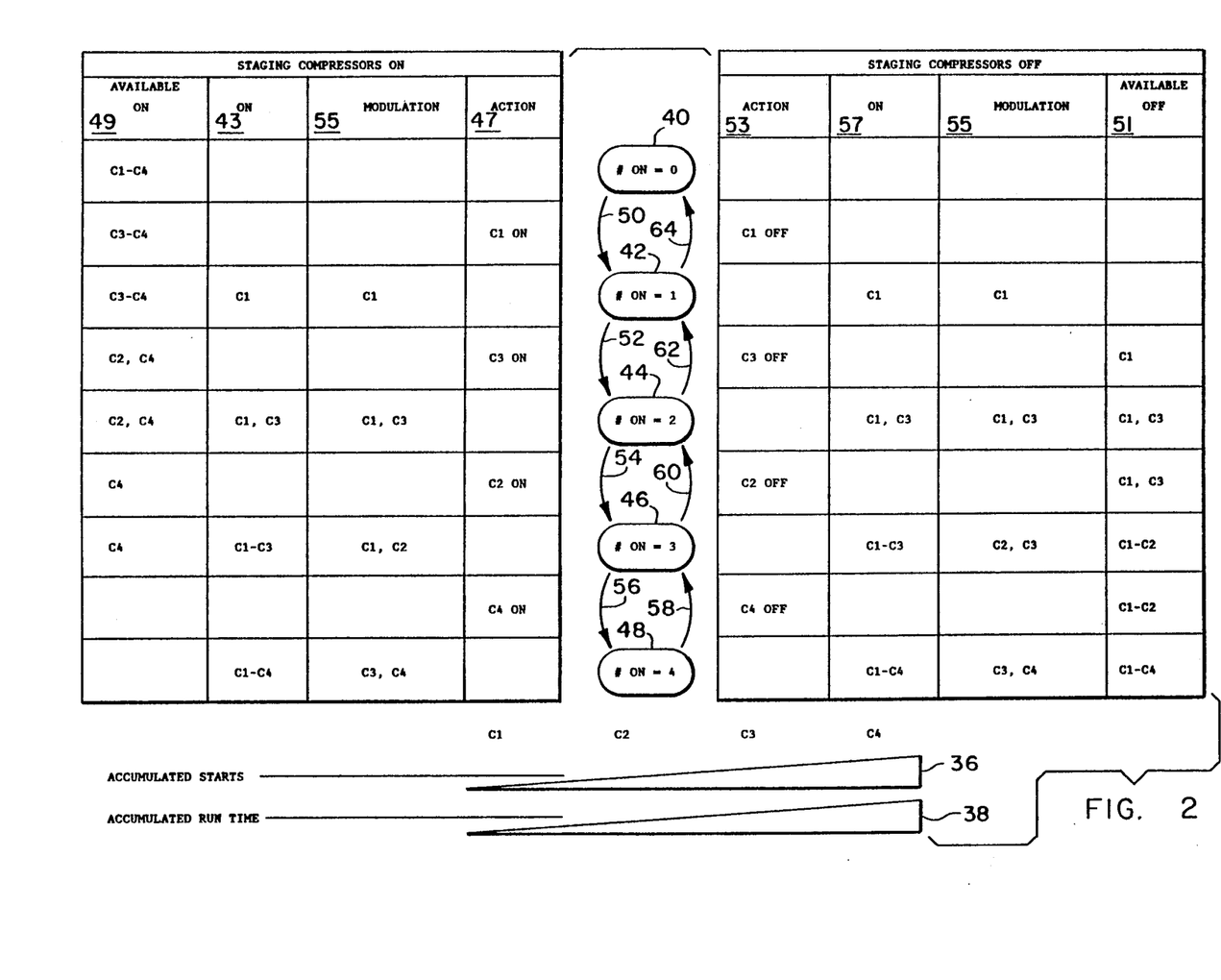
FIG. 2 is a staging diagram showing a specific example of the present invention as applied to the refrigeration system of FIG. 1.

FIG. 2 shows a staging diagram for the present invention as applied to the refrigeration system 10 of FIG. 1. Accumulated starts 36 relative to the compressors C1 through C4 are shown such that compressor C2 has more accumulated starts than compressor C1, compressor C3 has more accumulated starts than compressor C2, and compressor C4 has more accumulated starts than compressor C3. Similarly, accumulated run time 38 for the compressor's C1 through C4 is such that compressor C4 has more accumulated run time than compressor C3, compressor C3 has more accumulated run time than compressor C2, and compressor C2 has more accumulated run time than compressor C1.

In the staging diagram of FIG. 2, the ovals 40, 42, 44, 46, and 48 identify states where the number of compressors that are "on" are respectively 0, 1, 2, 3 and 4. Column 49 identifies the particular compressors which are available to be turned on. When the system controller 24 calls for an increase in capacity from the state 40, where no compressors are on, to the state 42 where one compressor is on, the available on list 49 of compressors is examined to determine the compressor with the lowest number of accumulated starts 36 Column 47 indicates the action taken in the staging on transition from state oval to state oval The compressor C1 is turned on as indicated by arrow 50 since the compressor C1 has the lowest number of accumulated starts 36. When the system controller 24 calls for an additional stage of cooling to be turned on the available on list 49 is examined to determine which compressors are available to be turned on. The compressor C3 is turned on as indicated by arrow 52 even though the compressor C2 has a lower number of starts than the compressor C3. This is to ensure that the maximum condensing surface area is obtained by using both condensing heat exchangers 16 and 18, instead of just condensing heat exchanger 16 as would occur if only compressors C1 and C2 were turned on.

The compressor C2 is turned on when another stage of cooling is called for as indicated by arrow 54 since compressor C2 has the lowest number of accumulated starts 36 and the number of compressors "on" is spread equally between the available refrigeration circuits Finally, with the next call for staging the remaining compressor C4 is turned on as indicated by arrow 56.

When adding stages, the last compressor turned on is always modulated as indicated by the modulation column 55. Thus at status oval 42, the compressor C1 is modulated as the last compressor turned on At status oval 44 the compressor C3 is modulated as the last compressor turned on, and the compressor C1 continues to modulate so as to form a modulating pair of compressors. Forming a modulating pair of compressors acts to balance the percent of rated load amps (RLA). As one compressor of a modulating pair changes load as determined by the percent of RLA, the other compressor of the modulating pair will give up or add load to equalize the motor current draw as determined by the percent RLA Additionally, modulating compressors in pairs has the advantage of increasing the modulating range of the system without the need to stage additional compressors on Effectively, the modulation range extends over the cumulative capacity of each compressors in the modulating pair or group.

At status oval 46, the compressor C2 is modulated as the last compressor turned on Additionally, the only remaining compressor on the circuit 12 with compressor C2 is also modulated, that compressor being C1, so as to provide a modulating pair of compressor C1, C2 on the same circuit 12. This ensures that the condensing heat exchangers 16 and 18 are used to their fullest extent since the compressor C3 is operating at full capacity while the compressors C1 and C2 each modulate. This has the further advantage of ensuring that one of the compressors C1 or C2 is turned off if the system calls for a decrease in capacity since only a modulating compressor should be staged off.

At status oval 48, the compressor C4 is modulated since it is the last compressor turned on Additionally, the compressor C3 is also modulated in accordance with the general rule of modulating the compressor with the greatest accumulated run time 38 and forming modulating pairs of compressors.

When the system controller 24 indicates that a compressor should be staged off to reduce cooling the available off column 51 is examined to determine which compressors are available to be turned off The modulating compressor C4 with the greatest accumulated run time 38 is staged off as indicated by the arrow 58 and by the action column 53. The compressor C3 continues to modulate as indicated by the modulation column 55 and the compressor C2 is also modulated since the compressor C2 is the compressor on the opposite circuit with the most accumulated run time 38. If compressor C3 had not been the only compressor on in refrigeration circuit 14, the other compressor on that circuit would have been modulated instead of compressor C2 so as to maximize the use of the condensing heat exchangers 16, 18. Column 57 indicates which compressors are still on relative to any particular state oval 40, 42, 44, 46, 48.

Next, the arrow 60 indicates that the compressor C2 is turned off to reduce system capacity since it is a modulating compressor on a circuit with two compressors running. If both modulating compressors had been on the same circuit, the modulating compressor with the most hours would have been turned off. The compressor C3 is modulated since it has the greatest accumulated run time 38 of the remaining on compressors. Additionally the compressor C1 is modulated so as to form a modulating pair.

When further staging reduction is desired, compressor C3 is turned off as shown by the arrow 62 since it is the compressor with the greatest accumulated run time 38. Finally, as indicated by the arrow 64, the remaining compressor C1 is turned off when no compressor cooling is required.

The foregoing example illustrates several general rules with regard to the present invention.

If the number of compressors operating or "on" is the same in each circuit, it is preferable to start the compressor with the lowest accumulated number of starts 36 and to stop the compressor with the most accumulated run time 38. It is also preferred to modulate the last compressor turned on if the compressor was recently turned on and to turn off a compressor that is part of a modulating pair if possible It is always preferred to modulate the compressor with the most accumulated run time.

If the circuits have unequal number of compressors operating then a list 49 of circuits with compressors available to turn on is determined by identifying which refrigerant circuits have less compressors on than the other circuits. From this available on list 49 the compressor with the lowest number of starts 36 is turned on Similarly a list 57 of refrigeration circuits having compressors available to be turned off is generated, and compressors having the most accumulated run time 38 are turned off using that available off list 51. The last compressor turned on is modulated, and it is preferable to turn off a modulating compressor. It also is preferable to modulate the compressor with the most accumulated run time.

Figure 3:
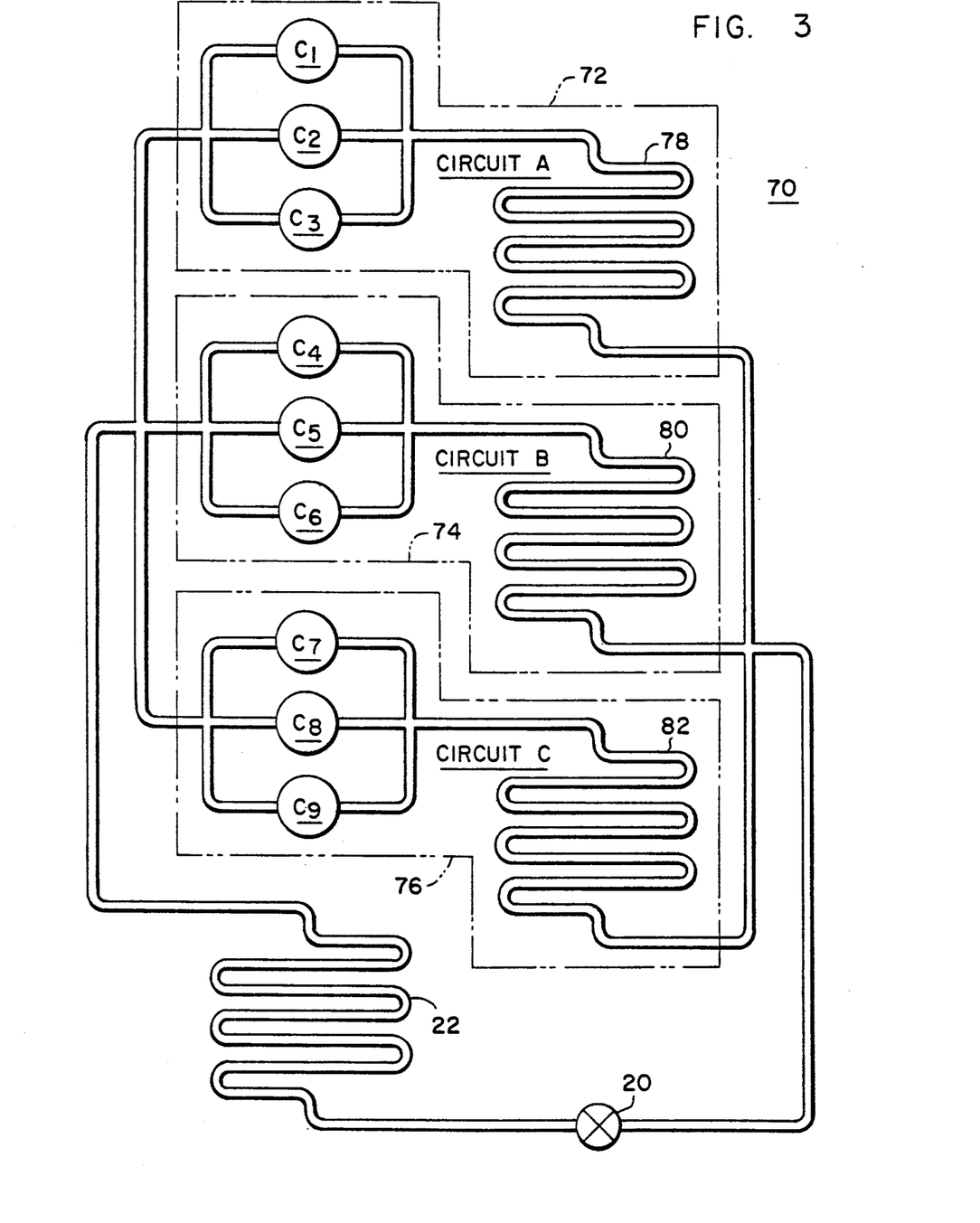
FIG. 3 is a refrigeration system having three circuits where each circuit includes three compressors.
Figure 4:
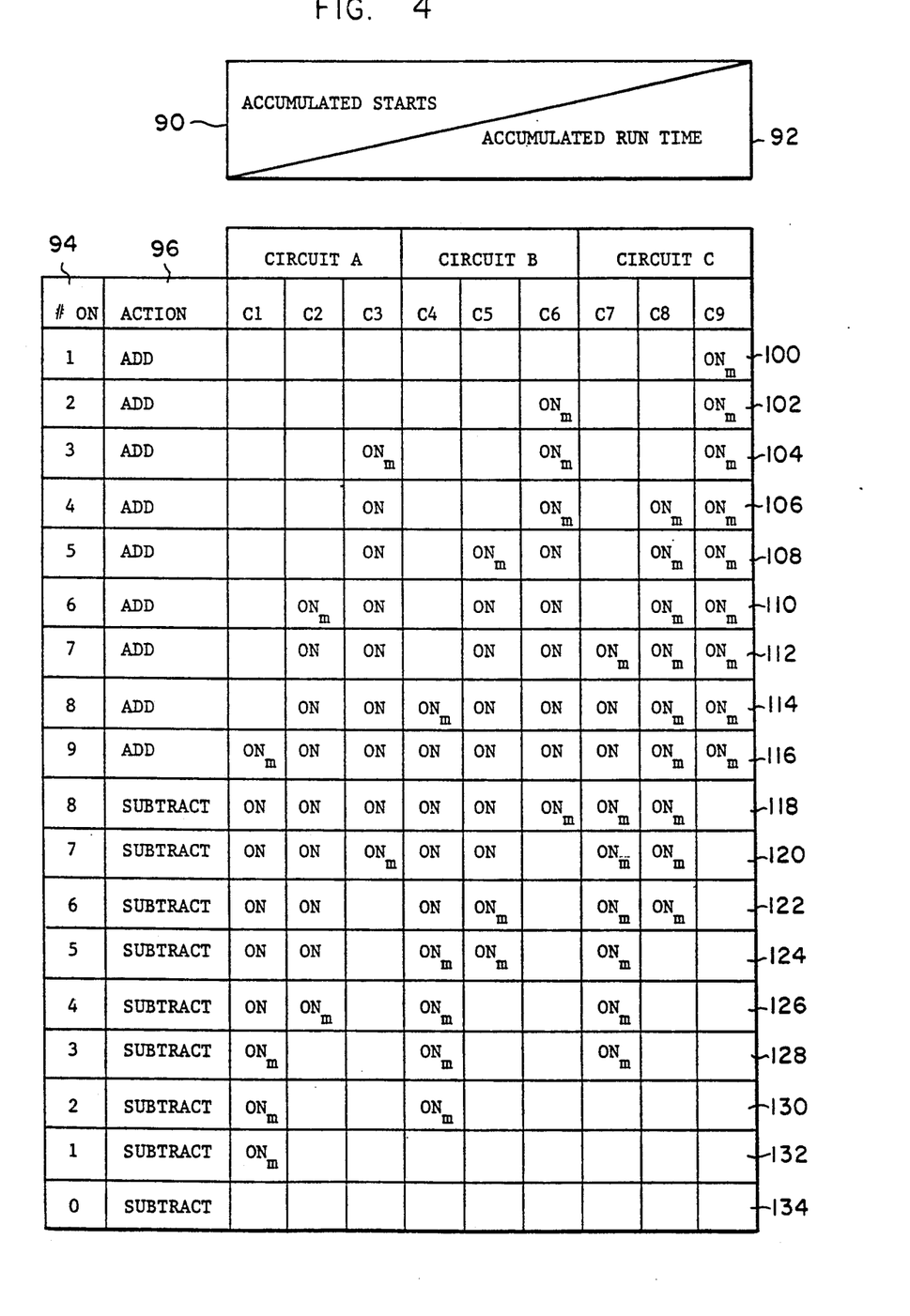
FIG. 4 is a table showing the present invention when applied so as to stage and modulate the system of FIG. 3.

These rules are illustrated in a further example with regard to FIGS. 3 and 4. FIG. 3 shows a refrigeration system 70 having three refrigeration circuits 72, 74 and 76 also respectively identified as circuits A, B and C. The circuit A includes compressors C1 C2 and C3 in parallel and a condensing heat exchanger 78 in series with the compressors C1, C2 and C3 Refrigeration circuit B includes compressors C4, C5 and C6 in parallel as well as a condensing heat exchanger 80 in series with compressors C4, C5 and C6 The refrigeration circuit C includes compressors C7, C8 and C9 in parallel with a condensing heat exchanger 82 in series with the compressors C7, C8 and C9. The remainder of the refrigeration system is essentially similar to the system 10 shown in FIG. 1 as well as the system described in U.S. Pat. No. 5,123,256 and the details thereof are omitted for the sake of simplicity.

FIG. 4 illustrates the staging of the refrigeration system 70 shown in FIG. 3. Instead of modulating in pairs, the compressors are modulated in groups where the group size is equal to the number of refrigeration circuits and where the rated load amp percentage is balanced within the group. The modulating compressor is indicated on FIGS. 4 and 5 through use of a subscript m. The reference numeral 90 indicates that the number of accumulated starts 90 is greatest for the compressor C1 and lowest for the compressor C9, while the amount of accumulated run time 92 is greatest for the compressor C9 and lowest for the compressor C1 as shown by the reference numeral 92. The column 94 indicates the number of compressors on, while the column 96 shows the action taken to result in any of the possible situations shown in the horizontal lines 100 through 134.

When the system controller initially decides that cooling is called for, all compressors C1–C9 are available to be turned on. The compressor C9 is turned on since it is the compressor with the lowest accumulated number of starts 90. The compressor C9 is also modulated.

When the next call for cooling is made at line 102, the compressor C6 is turned on since only the refrigeration circuits A and B now have compressors available for additional cooling, and the available on list includes only the compressors C1 through C6. Even though compressors C7 and C8 have a lower accumulated number of starts turning those compressors on would waste heat exchanging surface area by failing to use the condensing heat exchanger 80. Both compressors C9, C6 are modulated.

At line 104 the next call for staging a compressor on is illustrated where the compressor C3 is turned on and modulated. Only circuit A's compressors are on the available on list. All of the compressors C3, C6 and C9 are modulated.

At this point, all of the circuits A. B and C are available for staging since the number of compressors on and off is equal. Therefore, at line 106, the compressor C8 can be turned on and modulated in response to the next call for a cooling stage. Additionally the compressors C9 and C6 can also be modulated as the compressors with the most accumulated run time 92.

At line 108, only circuits A and B have compressors available to be turned on and therefore the compressor C5 is turned on and modulated in response to the next call for stage cooling. The compressors C9 and C8 are modulated as the compressors with the most accumulated run time 92.

At line 110, a compressor from circuit A must be turned on as only this circuit has compressors available to be turned on. The compressor C2 is turned on as the compressor with the least accumulated starts 90 of the compressor C1 and C2. The compressor C2 is modulated as the last compressor on and the compressor C8 and C9 are modulated as the compressors with the most accumulated run time 92.

At line 112 all the circuits are again equal and thus all the circuits are available to turn compressors on. Accordingly, the compressor C7 can be turned on as the compressor with the least accumulated number of starts 90. Additionally, the compressors C7. C8 and C9 can be modulated as the compressors with the greatest accumulated run time 92.

At line 114, only the circuits A and B have compressors available for cooling and thus the compressor C4 is turned on as the compressor with the least number of accumulated starts 90 and modulated as the last compressor on. The compressor C8 and C9 remain modulating as the compressors with the most accumulated run time 92.

Finally at line 116 the last compressor C1 is turned on in response to a call for a cooling stage and modulated as the last compressor on The compressor C8 and C9 continue to modulate as the compressors with the most accumulated run time 92.

In practice, it may be necessary to continually modulate the last compressor on indefinitely since its loading and current draw will not reach full capacity unless the system itself also reaches full capacity. At full capacity it would be easy to then interchange the modulation of compressors from modulating the last compressor on to modulating a compressor with more accumulated runtime than the last compressor on. FIG. 4 assumes that this has occurred at some point between lines 116 and 118 such that the modulating compressors are now compressors C7, C8 and C9.

Assuming now that the system controller 24 decides to gradually stage all the compressors C1–C9 off, all of the compressors C1–C9 are on the available off list. The compressor C9 is initially turned off at line 118 since it has the greatest accumulated run time 92. The compressors C6, C7 and C8 are modulated as they are the remaining compressors with the greatest accumulated run time 92.

At this point only the circuits A and B have compressors available to turn off since to turn off a compressor in circuit C would create a very large disparity in the cooling loads between the circuits. Accordingly, at line 120 the compressor C6 is turned off as the compressor with the greatest accumulated run time 92 The compressors C7 and C8 are modulated as having the greatest accumulated run time. However, although the compressor C5 has the next greatest accumulation of run time, the compressor C3 is modulated instead. This ensures that a compressor is modulating on the only circuit with compressors available to turn off, circuit A.

As noted, the circuit A now remains the only circuit with a compressor available to be turned off, and the compressor C3 is turned off at line 122 in response to the next call for a reduction in cooling since it is the compressor in circuit A with the greatest accumulated run time 92. The compressors C6, C7 and C8 modulate based on accumulated run time.

At this time, the circuits are again equal with two compressors "on" for each of the three circuits A. B and C. At line 124 the compressor C8 can be turned off since that is the compressor with the greatest accumulated run time 92. The compressors C7, C4 and C5 are modulated as the compressors with the greatest accumulated run time 92.

At line 126 only the circuits A and B have compressors available to be turned off and the compressor C5 is so turned off since it is the compressor with the greatest accumulated run time 92. The compressors C7, C4 and C2 are modulated.

At line 128 the compressor C2 is the only compressor with the greatest accumulated run time 92 available to be turned off since only a compressor from circuit A can now be turned off. All of the remaining compressors are modulated.

At the next reduction in staging at line 130 the compressor C7 is turned off as the compressor with the greatest accumulated run time and the remaining compressors C4 and C1 are modulated In the next reduction in staging at line 132 the compressor C4 is turned off and only the compressor C1 remains operating and modulating Finally at line 134 the compressor C1 is turned off and the system is no longer providing any cooling.

Figure 5:
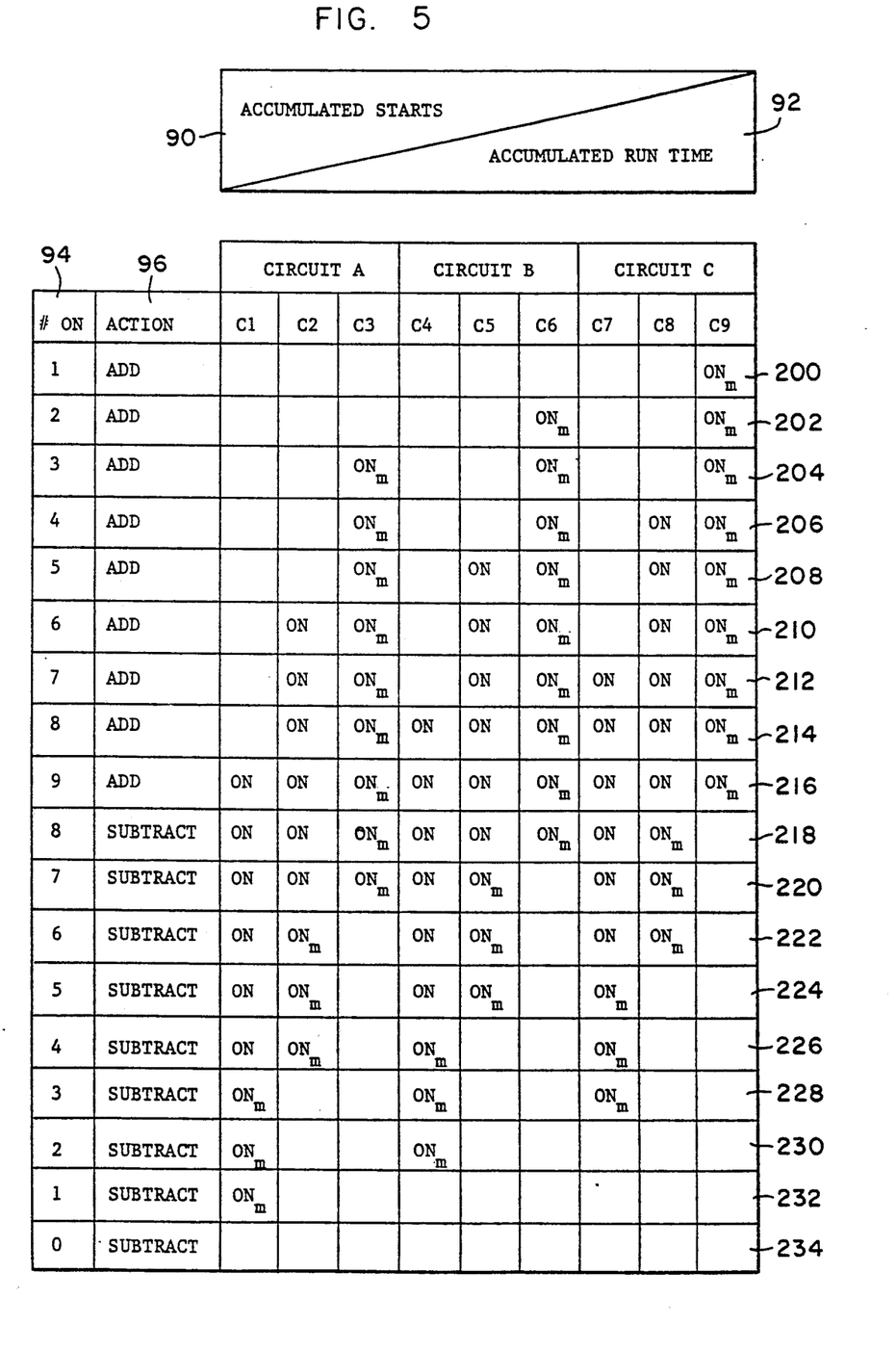
FIG. 5 is a table showing an alternative embodiment of the present invention when applied so as to stage and modulate the system of FIG. 3.

FIG. 5 illustrates an alternative embodiment of the staging of the refrigeration system shown in FIG. 3. The modulation of compressors in this alternative embodiment is directed to modulating the compressor on each circuit which has the most accumulated run time without regard to whether or not that compressor was the last compressor turned on. The staging of compressors is the same as that arrangement shown in FIG. 4. Only the modulation decisions vary. Additionally, the reference numerals identifying each action line have been increased by 100. It should be noted that this application contemplates, among others, application to directly positionable slide valves for screw compressors.

Since the staging between FIGS. 4 and 5 does not vary, only the compressor modulation is fully described in connection with FIG. 5. In line 200, 202 and 204 all of the compressors that are on are also modulated. At line 206 compressors C3, C6 and C9 are modulated as the compressors with the most available run time. Although the compressor C8 has just been turned on it does not modulate. Rather, the compressor C8 goes to full load as quickly as possible, and the modulating compressors C3, C6, C9 transfer load to allow this to occur. Similarly, at lines 208, 210, 212, 214 and 216 the compressors C3, C6 and C9 are modulated as the compressors with the most accumulated run time, transferring load to other compressors to allow them to reach full load as quickly as possible.

At line 218 when compressor C9 is turned off the compressor C8 is modulated as the compressor on that circuit with the most accumulated run time Similarly, at line 220 when the compressor C6 is turned off the compressor C5 is modulated in its place as the compressor on the circuit with the most accumulated run time. This occurs on circuit A when at line 222 the compressor C3 is turned off as the compressor with the most accumulated run time and the compressor C2 is modulated in its place. At line 224 the compressor C7 is modulated when the compressor C8 is turned off and at line 226 the compressor C4 is modulated in place of the compressor C5 when it is turned off. At lines 228, 230 and 232 all of the compressors which are on are also modulated.

It is contemplated that different numbers of modulating compressors could be selected such that four or more compressors could be modulated when seven or more compressors are on. To some extent this is determined by system design and the effort involved in programming the controller 24. All such variations are intended to be within the spirit and scope of the following claims.

We claim:

1. A method of staging and modulating compressors in a multi-circuited refrigeration system including a plurality of condensing heat exchange circuits where each condensing heat exchange circuit includes a plurality of compressors, the method comprising the steps of:
   accumulating a first operative condition for each compressor;
   accumulating a second operative condition for each compressor;
   determining the status of each compressor in each circuit and designating therefrom a first list of circuits having compressors available to be turned on and a second list of circuits having compressors available to be turned off;
   initiating operation of the compressor from the first list with the lowest accumulation of the first operative condition whenever the system calls for an increase in capacity;
   terminating operation of the compressor from the second list having the greatest accumulation of the second operative condition whenever the system calls for a decrease in capacity;
   determining the number of compressors which should be modulating; and
   modulating, subject to the modulating compressor number determining step, the compressors necessary to meet the modulating compressor number in accordance with the greatest accumulation of the second operative condition.

2. The method of claim 1 including the further step of modulating a single compressor on a particular refrigeration circuit only if no other circuits have more than one compressor on.

3. The method of claim 1 wherein the first operative condition is the compressor run time and the second operative condition is the number of compressor starts.

4. The method of claim 1 wherein the first operative condition is the number of compressor starts and the second operative is the compressor run time.

5. The method of claim 4 wherein the number in the modulating compressor determining step is determined in direct proportion to the number of refrigeration circuits.

6. The method of claim 5 including the further step of modulating the last compressor initiated on without regard to the second operative condition whenever a compressor has just been turned on.

7. The method of claim 6 including the further step of modulating the compressor on each circuit with the greatest accumulation of the second operative condition.

8. The method of claim 5 including the further step of modulating compressors in groups of at least two compressors.

9. The method of claim 8 including the further step of balancing the percent of rated load amps between the compressors of a modulating group.

10. The method of claim 1 including the further step of modulating the last compressor initiated on whenever a compressor has just been turned on.

11. The method of claim 1 including the further step of modulating the compressor on each circuit with the greatest accumulation of the second operative condition.

12. The method of claim 1 including the further step of modulating compressors in groups of at least two compressors.

13. The method of claim 12 including the further step of balancing the percent of rated load amps between the compressors of a modulating group.

14. A method of staging a plurality of compressors in a refrigeration system including a plurality of condensing circuits where the number of compressors is greater than the number of condensing circuits and where at least one compressor is operationally associated with each circuit and where more than one circuit has more than one compressor operatively associated with it, the method comprising the steps of:
   accumulating a first operative condition for each compressor;
   accumulating a second operative condition for each compressor;
   determining which circuits have compressors available to be turned on;
   determining which circuits have compressors available to be turned off;
   initiating operation of the compressor with the fewest accumulation of the first operative condition from the available on list whenever the system calls for an increase in system capacity;
   terminating operation of the compressor with the greatest accumulation of the second operative condition from the available off list whenever the system calls for a decrease in capacity; and
   modulating the last compressor turned on and at least the compressor with the greatest accumulation of the second operative condition 15. The method of claim 14 including the further step of modulating compressors in groups of at least two compressors.

16. The method of claim 15 including the further step of balancing the percent of rated load amps between the compressors of a modulating group.

17. A method of staging a plurality of compressors in a refrigeration system including a plurality of condensing circuits where the number of compressors is greater than the number of condensing circuits and where at least one compressor is operationally associated with each circuit and where more than one circuit has more than one compressor operatively associated with it, the method comprising the steps of:
   accumulating a first operative condition for each compressor;
   accumulating a second operative condition for each compressor;
   determining which circuits have compressors available to be turned on;
   determining which circuits have compressors available to be turned off;
   initiating operation of the compressor with the fewest accumulation of the first operative condition from the available on list whenever the system calls for an increase in system capacity;
   terminating operation of the compressor with the greatest accumulation of the second operative condition from the available off list whenever the system calls for a decrease in capacity; and
   modulating compressors in groups of at least two compressors.

18. The method of claim 17 including the further step of balancing the percent of rated load amps between the compressors of a modulating group.

19. The method of claim 18 including the further step of modulating the last compressor initiated on whenever a compressor has just been turned on.

20. The method of claim 17 including the further step of modulating the last compressor initiated on whenever a compressor has just been turned on.

* * * * *